United States Patent
Fudemoto et al.

(10) Patent No.: US 9,683,080 B2
(45) Date of Patent: Jun. 20, 2017

(54) TIRE

(71) Applicant: BRIDGESTONE CORPORATION, Chuo-ku, Tokyo (JP)

(72) Inventors: Hiroyuki Fudemoto, Tokyo (JP); Yasunori Tarutani, Tokyo (JP); Yuki Itoh, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/779,972

(22) PCT Filed: Mar. 27, 2014

(86) PCT No.: PCT/JP2014/058980
§ 371 (c)(1),
(2) Date: Sep. 25, 2015

(87) PCT Pub. No.: WO2014/157558
PCT Pub. Date: Oct. 2, 2014

(65) Prior Publication Data
US 2016/0046764 A1 Feb. 18, 2016

(30) Foreign Application Priority Data
Mar. 29, 2013 (JP) .................. 2013-074296

(51) Int. Cl.
| | | |
|---|---|---|
| *B60C 1/00* | (2006.01) | |
| *C08G 69/10* | (2006.01) | |
| *B60C 5/01* | (2006.01) | |
| *C08G 69/40* | (2006.01) | |
| *C08G 69/44* | (2006.01) | |
| *B60C 9/22* | (2006.01) | |
| *B29D 30/06* | (2006.01) | |
| *B60C 5/00* | (2006.01) | |
| *B29D 30/32* | (2006.01) | |

(52) U.S. Cl.
CPC .......... *C08G 69/10* (2013.01); *B29D 30/0678* (2013.01); *B60C 1/00* (2013.01); *B60C 1/0041* (2013.04); *B60C 5/007* (2013.01); *B60C 5/01* (2013.01); *B60C 9/2204* (2013.04); *C08G 69/40* (2013.01); *C08G 69/44* (2013.01); *B29D 2030/3285* (2013.01)

(58) Field of Classification Search
CPC .................................. B60C 1/00; B60C 5/007
See application file for complete search history.

(56) References Cited

U.S. PATENT DOCUMENTS

| | | |
|---|---|---|
| 2009/0274913 A1 | 11/2009 | Kirino et al. |
| 2011/0269871 A1 | 11/2011 | Kirino et al. |
| 2013/0206301 A1 | 8/2013 | Fudemoto et al. |

FOREIGN PATENT DOCUMENTS

| | | |
|---|---|---|
| CN | 101472975 A | 7/2009 |
| JP | 2003-104008 A | 4/2003 |
| JP | 2009-233998 A | 10/2009 |
| JP | 2011-246685 A | 12/2011 |
| JP | 2012-46030 A | 3/2012 |
| WO | 2012/026547 A1 | 3/2012 |

OTHER PUBLICATIONS

Machine translation of JP2012046030, 2012.*

* cited by examiner

*Primary Examiner* — Wenwen Cai
(74) *Attorney, Agent, or Firm* — SOLARIS Intellectual Property Group, PLLC

(57) ABSTRACT

A tire includes a circular tire frame formed of a resin material, the resin material including a polyamide-based thermoplastic elastomer having a weight average molecular weight of from 15,700 to 75,000. Included with the tire may be side portions and a crown portion that serves as an outer peripheral portion that is in communication with the side portions.

1 Claim, 4 Drawing Sheets

TIRE

BACKGROUND OF THE INVENTION

Technical Field

The present invention relates to a tire to be fitted to a rim and, in particular, to a tire in which at least a portion of a tire case is formed of a resin material.

Background Art

Conventionally, pneumatic tires constructed from rubber, organic fiber materials, steel members, and the like have been used in vehicles such as passenger cars. Regarding general rubber materials that are used for conventional pneumatic tires, there are no problems in terms of heat resistance and the like. However, the process for manufacturing a tire usually includes plural steps, for example, kneading, sheeting, molding, and vulcanization, and therefore, improvement in productivity has been required.

In regard to the above, recently, from the viewpoints of weight reduction, ease of molding, and ease of recycling, research has been conducted on the use of resin materials as the tire material; in particular, thermoplastic resins, thermoplastic elastomers, and the like. For example, Patent Document 1 (Japanese Patent Application Laid-Open (JP-A) No. 2003-104008) indicated below and the like disclose a pneumatic tire which is formed using a thermoplastic polymer material. These thermoplastic polymer materials (thermoplastic resins) have a lot of advantages from the viewpoint of improvement in productivity, such as by enabling injection molding.

Further, a tire in which a polyamide-based thermoplastic elastomer is used as the thermoplastic polymer material has been proposed (see Patent Document 2 (JP-A No. 2012-46030)).

PRIOR ART DOCUMENTS

Patent Document 1: JP-A No. 2003-104008
Patent Document 2: JP-A No. 2012-46030

SUMMARY OF INVENTION

Technical Problem

Tires, in which a thermoplastic polymer material is used, are easily produced and are inexpensive, compared with conventional tires made of rubber. However, in a case in which a tire frame is formed of a uniform thermoplastic polymer material that does not incorporate a reinforcing member such as a carcass ply, there is room for improvement in view of pressure resistance and the like, as compared with conventional tires made of rubber.

In particular, generally, in conventional tires made of rubber, by using a carcass or a ply, shape retention is performed when internal pressure is applied to the tire. On the other hand, in tires in which a polymer material (resin) is used as described above, a mode of hooping with a steel cord along a tire circumferential direction, for example, in which a reinforcing member such as a carcass or a ply is not taken as an essential constituent element, has been proposed. As such, in tires in which a polymer material is used, since it is assumed that a reinforcing member is not used at the side portion, it is required that the pressure resistance can be ensured by the polymer material itself.

Moreover, in tires in which a thermoplastic polymer material is used, it is also required to ensure excellent fittability onto a rim, such that the tire can be assembled onto a rim and such that the air in the inner part does not leak when the tire is assembled onto a rim.

The invention has been made based on the above circumstances, and an object of the invention is to provide a tire which is formed using a resin material and has excellent pressure resistance, excellent fittability onto a rim, and excellent moldability.

Solution to Problem

[1] A tire has a circular tire frame formed of a resin material, the resin material including a polyamide-based thermoplastic elastomer having a weight average molecular weight of from 15,700 to 75,000.

Advantageous Effects of Invention

According to the invention, a tire may be provided which is formed using a resin material and has excellent pressure resistance, excellent fittability onto a rim, and excellent moldability.

DESCRIPTION OF EMBODIMENTS

Figure 1A:
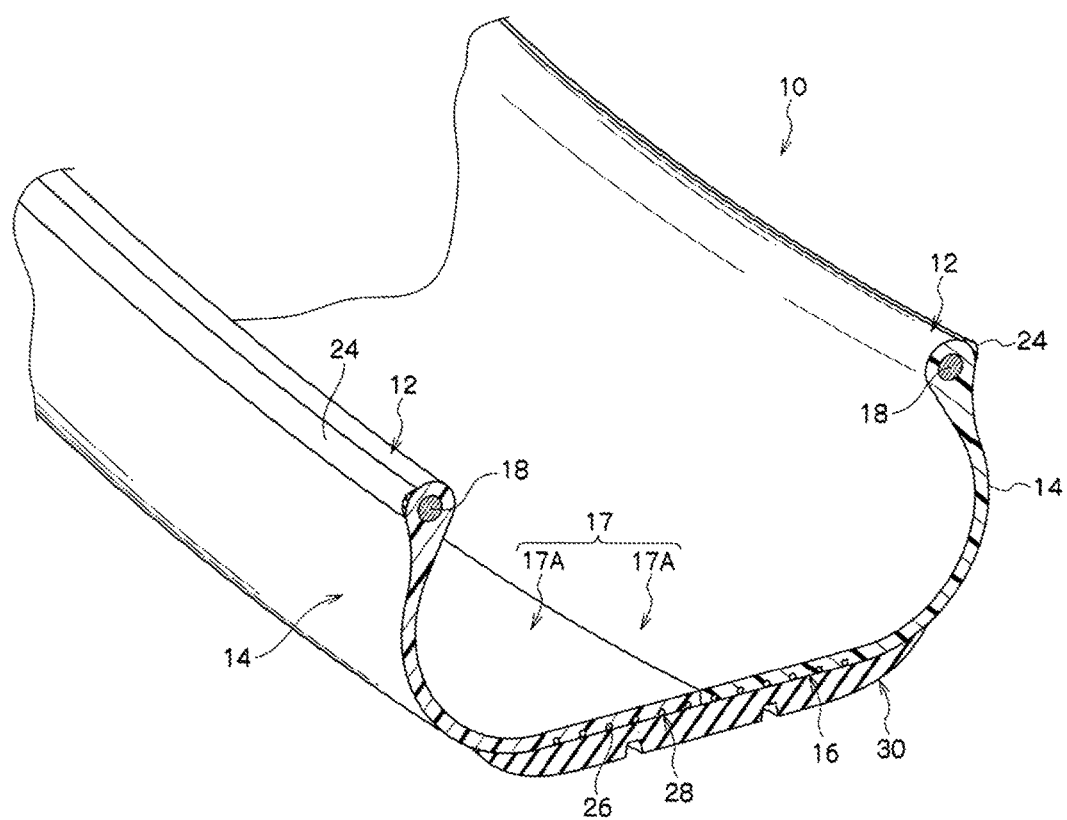
FIG. 1A is a perspective view illustrating a partial cross-section of a tire according to an embodiment of the present invention.

The tire of the invention has a circular tire frame formed of a resin material, the resin material including a polyamide-based thermoplastic elastomer having a weight average molecular weight of from 15,700 to 75,000.

In the tire of the invention, since the tire frame in the invention is configured to include a polyamide-based thermoplastic elastomer having a weight average molecular weight of from 15,700 to 75,000, the pressure resistance with respect to internal pressure is excellent. Further, the tire can be assembled onto a rim, and the air in the inner part is less likely to leak when the tire is assembled onto a rim, and thus, fittability onto a rim is excellent. Moreover, since the tire of the invention has excellent moldability and it is also possible to form a tire frame by injection molding, productivity is excellent.

<<Resin Material>>

As described above, the tire has a tire frame formed by using a resin material. The resin material includes at least a polyamide-based thermoplastic elastomer having a weight average molecular weight of from 15,700 to 75,000. The resin material may include a thermoplastic elastomer other than the polyamide-based thermoplastic elastomer or any components; however, the content of the polyamide-based thermoplastic elastomer having a weight average molecular weight of from 15,700 to 75,000 with respect to the total amount of the resin material is preferably 30% by mass or higher, more preferably 50% by mass or higher, and particularly preferably 70% by mass or higher. Here, the concept of the term "resin" used in the present specification encompasses thermoplastic resins and thermosetting resins, but does not encompass natural rubbers.

Thermoplastic Polyamide-Based Elastomer

In the invention, "thermoplastic polyamide-based elastomer" refers to a thermoplastic resin material that is formed of a copolymer having a polymer constituting a hard segment that is crystalline and has a high melting temperature, and a polymer constituting a soft segment that is amorphous and has a low glass transition temperature, wherein the polymer constituting the hard segment has amide bonds (—CONH—) in the main chain thereof.

The thermoplastic polyamide-based elastomer is also sometimes simply referred to as ThermoPlastic Amide elastomer ("TPA").

The polyamide-based thermoplastic elastomer includes a material in which at least a polyamide constitutes a crystalline hard segment having a high melting temperature and another polymer (for example, a polyester or a polyether) constitutes a non-crystalline soft material having a low glass transition temperature. Further, in the polyamide-based thermoplastic elastomer, a chain extending agent such as a dicarboxylic acid may be used in a linking portion of the hard segment and the soft segment.

—Hard Segment—

Examples of the polyamide for forming the hard segment include a polyamide produced using a monomer represented by the following Formula (1) or Formula (2).

Formula (1)

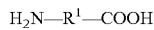

In Formula (1), $R^1$ represents a hydrocarbon molecular chain having a carbon number of from 2 to 20 or an alkylene group having a carbon number of from 2 to 20.

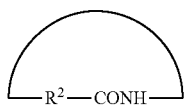

Formula (2)

In Formula (2), $R^2$ represents a hydrocarbon molecular chain having a carbon number of from 3 to 20 or an alkylene group having a carbon number of from 3 to 20.

In Formula (1), $R^1$ is preferably a hydrocarbon molecular chain having a carbon number of from 3 to 18 or an alkylene group having a carbon number of from 3 to 18, more preferably a hydrocarbon molecular chain having a carbon number of from 4 to 15 or an alkylene group having a carbon number of from 4 to 15, and particularly preferably a hydrocarbon molecular chain having a carbon number of from 10 to 15 or an alkylene group having a carbon number of from 10 to 15. Further, in Formula (2), $R^2$ is preferably a hydrocarbon molecular chain having a carbon number of from 3 to 18 or an alkylene group having a carbon number of from 3 to 18, more preferably a hydrocarbon molecular chain having a carbon number of from 4 to 15 or an alkylene group having a carbon number of from 4 to 15, and particularly preferably a hydrocarbon molecular chain having a carbon number of from 10 to 15 or an alkylene group having a carbon number of from 10 to 15.

Examples of the monomer represented by Formula (1) or (2) include an ω-aminocarboxylic acid and a lactam. Further, examples of the polyamide that forms the hard segment include a polycondensate of a ω-aminocarboxylic acid or a lactam, and a copolycondensate of a diamine and a dicarboxylic acid.

Examples of the ω-aminocarboxylic acid include aliphatic ω-aminocarboxylic acids having a carbon number of from 5 to 20, such as 6-aminocaproic acid, 7-aminoheptanoic acid, 8-aminooctanoic acid, 10-aminocapric acid, 11-aminoundecanoic acid, and 12-aminododecanoic acid. Further, examples of the lactam include aliphatic lactams having a carbon number of from 5 to 20, such as lauryllactam, ε-caprolactam, undecanolactam, ω-enantholactam, and 2-pyrrolidone.

Examples of the diamine include diamine compounds, for example, aliphatic diamines having a carbon number of from 2 to 20, such as ethylenediamine, trimethylenediamine, tetramethylenediamine, hexamethylenediamine, heptamethylenediamine, octamethylenediamine, nonamethylenediamine, decamethylenediamine, undecamethylenediamine, dodecamethylenediamine, 2,2,4-trimethylhexamethylenediamine, 2,4,4-trimethylhexamethylenediamine, 3-methylpentamethylenediamine, and methaxylenediamine. Further, the dicarboxylic acid may be represented by HOOC—$(R^3)$m—COOH ($R^3$: a hydrocarbon molecular chain having a carbon number of from 2 to 20, m: 0 or 1), and examples thereof include aliphatic dicarboxylic acids having a carbon number of from 2 to 22, such as oxalic acid, succinic acid, glutaric acid, adipic acid, pimelic acid, suberic acid, azelaic acid, sebacic acid, and dodecanedioic acid.

Examples of the polyamide that forms the hard segment may include a polyamide (polyamide 6) obtained by ring-opening polycondensation of ε-caprolactam, a polyamide (polyamide 11) obtained by ring-opening polycondensation of undecanolactam, a polyamide (polyamide 12) obtained by ring-opening polycondensation of lauryllactam, a polyamide (polyamide 12) obtained by polycondensation of 12-aminododecanoic acid, a polyamide (polyamide 66) which is a polycondensation product of a diamine and a dibasic acid, and a polyamide (amide MX) which has meta-xylene diamine as a structural unit.

The polyamide 6 can be represented by, for example, $\{CO—(CH_2)_5—NH\}_n$ (wherein n represents an arbitrary number of repeating units) and, for example, n is preferably from 2 to 100, and more preferably from 3 to 50.

The polyamide 11 can be represented by, for example, $\{CO—(CH_2)_{10}—NH\}_n$ (wherein n represents an arbitrary number of repeating units) and, for example, n is preferably from 2 to 100, and more preferably from 3 to 50.

The polyamide 12 can be represented by, for example, $\{CO—(CH_2)_{11}—NH\}_n$ (wherein n represents an arbitrary number of repeating units) and, for example, n is preferably from 2 to 100, and more preferably from 3 to 50.

The polyamide 66 can be represented by, for example, $\{CO(CH_2)_4CONH(CH_2)_6NH\}_n$ (wherein n represents an arbitrary number of repeating units) and, for example, n is preferably from 2 to 100, and more preferably from 3 to 50.

Moreover, the amide MX which has meta-xylene diamine as a structural unit can be represented by, for example, the following constituent unit (A-1) (in (A-1), n represents an arbitrary number of repeating units) and, for example, n is preferably from 2 to 100, and more preferably from 3 to 50.

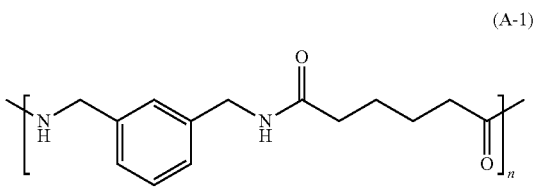

(A-1)

It is preferable that the polyamide-based thermoplastic elastomer has a polyamide (polyamide 12) having a unit structure represented by $-[CO-(CH_2)_{11}-NH]-$, as the hard segment. As described above, the polyamide 12 can be obtained by ring-opening polycondensation of lauryllactam or polycondensation of 12-aminododecanoic acid.

The polymer that forms the soft segment may be, for example, a polyester or a polyether, and examples thereof include polyethylene glycol, polypropylene glycol, polytetramethylene ether glycol (PTMG), and an ABA-type triblock polyether. These may be used singly or in combination of two or more kinds thereof. A polyether diamine obtained by allowing terminals of a polyether with ammonia or the like, for example, may also be used.

Here, the "ABA-type triblock polyether" means a polyether represented by the following Formula (3).

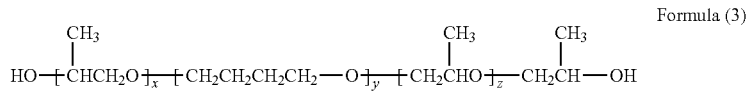

Formula (3)

In Formula (3), x and z each independently represent an integer of 1 to 20. y represents an integer of 4 to 50.

In Formula (3), x and z are each preferably an integer of 1 to 18, more preferably an integer of 1 to 16, particularly preferably an integer of 1 to 14, and most preferably an integer of 1 to 12. Further, in Formula (3), y is preferably an integer of 5 to 45, more preferably an integer of 6 to 40, particularly preferably an integer of 7 to 35, and most preferably an integer of 8 to 30.

In addition, the "ABA-type triblock polyether diamine" means a polyether diamine represented by the following Formula (N).

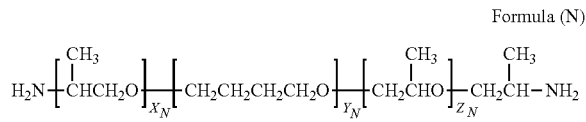

Formula (N)

In Formula (N), $X_N$ and $Z_N$ each independently represent an integer of 1 to 20. $Y_N$ represents an integer of 4 to 50.

In Formula (N), $X_N$ and $Z_N$ are each preferably an integer of 1 to 18, more preferably an integer of 1 to 16, particularly preferably an integer of 1 to 14, and most preferably an integer of 1 to 12. Further, in Formula (N), $Y_N$ is preferably an integer of 5 to 45, more preferably an integer of 6 to 40, particularly preferably an integer of 7 to 35, and most preferably an integer of 8 to 30.

Examples of a combination of the hard segment and the soft segment may include respective combinations of the hard segment and the soft segment described above. Among them, a combination of a ring-opening polycondensation product of lauryllactam/polyethylene glycol, a combination of a ring-opening polycondensation product of lauryllactam/polypropylene glycol, a combination of a ring-opening polycondensation product of lauryllactam/polytetramethylene ether glycol, a combination of a ring-opening polycondensation product of lauryllactam/an ABA-type triblock polyether, a combination of a ring-opening polycondensation product of lauryllactam/an ABA-type triblock polyether diamine, a combination of a polycondensation product of aminododecanoic acid/polyethylene glycol, a combination of a polycondensation product of aminododecanoic acid/polypropylene glycol, a combination of a polycondensation product of aminododecanoic acid/polytetramethylene ether glycol, a combination of a polycondensation product of aminododecanoic acid/an ABA-type triblock polyether, and a combination of a polycondensation product of aminododecanoic acid/an ABA-type triblock polyether diamine are preferable. A combination of a ring-opening polycondensation product of lauryllactam/an ABA-type triblock polyether, a combination of a ring-opening polycondensation product of lauryllactam/an ABA-type triblock polyether diamine, a combination of a polycondensation product of aminododecanoic acid/an ABA-type triblock polyether, and a combination of a polycondensation product of aminododecanoic acid/an ABA-type triblock polyether diamine are particularly preferable.

The polymer that forms the soft segment may include a diamine such as a branched saturated diamine having from 6 to 22 carbon atoms, a branched alicyclic diamine having from 6 to 16 carbon atoms, or a norbornane diamine, as the monomer unit. These branched saturated diamine having from 6 to 22 carbon atoms, branched alicyclic diamine having from 6 to 16 carbon atoms, and norbornane diamine may be used singly or in a combination thereof, or may be used in combination with the ABA-type triblock polyether or the ABA-type triblock polyether diamine described above.

Examples of the branched saturated diamine having from 6 to 22 carbon atoms include 2,2,4-trimethyl-1,6-hexanediamine, 2,4,4-trimethyl-1,6-hexanediamine, 1,2-diaminopropane, 1,3-diaminopentane, 2-methyl-1,5-diaminopentane, and 2-methyl-1,8-diaminooctane.

Examples of the branched alicyclic diamine having from 6 to 16 carbon atoms may include 5-amino-2,2,4-trimethyl-1-cyclopentanemethylamine and 5-amino-1,3,3-trimethylcyclohexanemethylamine. These diamines may be any of a cis form or a trans form, or may be a mixture of these isomers.

Examples of the norbornane diamine include 2,5-norbornanedimethylamine, 2,6-norbornanedimethylamine, and mixtures thereof.

Moreover, the polymer that constitutes the soft segment may include an additional diamine compound other than the diamines described above, as the monomer unit. Examples of the additional diamine compound include aliphatic diamines such as ethylenediamine, trimethylenediamine, tetramethylenediamine, hexamethylenediamine, heptamethylenediamine, octamethylenediamine, nonamethylenediamine, decamethylenediamine, undecamethylenediamine, dodecamethylenediamine, 2,2,4-trimethylhexamethylene diamine, 2,4,4-trimethylhexamethylene diamine, or 3-methylpentamethylene diamine; alicyclic diamines such as bis(4-aminocyclohexyl)methane, bis(4-aminocyclohexyl)propane, 1,3-bis(aminomethyl)cyclohexane, or 1,4-bis(aminomethyl)cyclohexane; and aromatic diamines such as meta-xylylene diamine or para-xylylene diamine.

The diamines described above may be used singly, or two or more kinds thereof may be used in an appropriate combination.

—Chain Extending Agent—

As described above, in the polyamide-based thermoplastic elastomer, a chain extending agent such as a dicarboxylic acid may be used, in addition to the hard segment and the soft segment. As the dicarboxylic acid, for example, at least one selected from aliphatic, alicyclic, and aromatic dicarboxylic acids, or a derivative thereof can be used.

Specific examples of the dicarboxylic acid may include a straight chain aliphatic dicarboxylic acid having from 2 to 25 carbon atoms, such as adipic acid, decanedicarboxylic acid, oxalic acid, succinic acid, glutaric acid, pimelic acid, suberic acid, azelaic acid, sebacic acid, or dodecanedioic acid; an aliphatic dicarboxylic acid such as a dimerized aliphatic dicarboxylic acid having from 14 to 48 carbon atoms, which can be prepared by dimerization of unsaturated fatty acids obtained by fractional distillation of triglyceride, or a hydrogenated product thereof; an alicyclic dicarboxylic acid such as 1,4-cyclohexanedicarboxylic acid; and an aromatic dicarboxylic acid such as terephthalic acid or isophthalic acid.

—Molecular Weight—

In the invention, the polyamide-based thermoplastic elastomer included in the resin material has a weight average molecular weight of from 15,700 to 75,000. When the weight average molecular weight of the polyamide-based thermoplastic elastomer is less than 15,700, the viscosity is decreased, and a burr is easily generated. Further, when the weight average molecular weight of the polyamide-based thermoplastic elastomer exceeds 75,000, the melt viscosity is increased and there is concern for occurrence of shortage of filling at the time of forming the tire frame, and therefore, it is necessary to raise the molding temperature and the temperature of the mold. Accordingly, the cycle time becomes long, and thus, the productivity is inferior. The weight average molecular weight of the polyamide-based thermoplastic elastomer is preferably from 20,000 to 75,000. The weight average molecular weight of the polyamide-based thermoplastic elastomer can be measured by gel permeation chromatography (GPC) and, for example, a GPC (gel permeation chromatography) such as "HLC-8320GPC ECO SEC" (trade name, manufactured by Tosoh Corporation) can be used.

The number average molecular weight of the polymer (polyamide) that constitutes the hard segment is preferably from 300 to 15,000, from the viewpoint of melt moldability. Further, the number average molecular weight of the polymer that constitutes the soft segment is preferably from 200 to 6,000, from the viewpoints of toughness and low temperature flexibility.

In the polyamide-based thermoplastic elastomer, the mass ratio (x:y) of the hard segment (x) to the soft segment (y) is preferably from 50:50 to 90:10, and more preferably from 50:50 to 80:20, from the viewpoint of moldability.

The content of the hard segment in the polyamide-based thermoplastic elastomer is preferably from 5% by mass to 95% by mass, more preferably from 10% by mass to 90% by mass, and particularly preferably from 15% by mass to 90% by mass, with respect to the total amount of the polyamide-based thermoplastic elastomer.

The content of the soft segment in the polyamide-based thermoplastic elastomer is preferably from 10% by mass to 95% by mass, more preferably from 10% by mass to 90% by mass, and particularly preferably from 10% by mass to 85% by mass, with respect to the total amount of the polyamide-based thermoplastic elastomer.

In the case of using the chain extending agent, the content of the chain extending agent is preferably determined such that the carboxyl group of the chain extending agent and the hydroxyl group or amino group of the monomer that constitutes the soft segment are almost in equimolecular amounts.

The polyamide-based thermoplastic elastomer can be synthesized by copolymerizing a polymer which forms the hard segment and a polymer which forms the soft segment, according to a known method. For example, the polyamide-based thermoplastic elastomer can be obtained through polymerization, in a container, using a monomer (for example, an ω-aminocarboxylic acid such as 12-aminododecanoic acid, or a lactam such as lauryllactam) that constitutes the hard segment, a monomer (for example, the ABA-type triblock polyether or the ABA-type triblock polyether diamine) that constitutes the soft segment, and a chain extending agent (for example, adipic acid or decanedicarboxylic acid). Particularly, in a case in which an ω-aminocarboxylic acid is used as the monomer that constitutes the hard segment, a polyamide-based thermoplastic elastomer can be synthesized by carrying out melt polymerization under atmospheric pressure, or by a method including melt polymerization under atmospheric pressure and subsequent melt polymerization under reduced pressure. In a case in which a lactam is used as the monomer that constitutes the hard segment, a polyamide-based thermoplastic elastomer can be produced by a method including, in the presence of an appropriate amount of water, melt polymerization under increased pressure of from 0.1 MPa to 5 MPa and subsequent melt polymerization under atmospheric pressure and/or melt polymerization under reduced pressure. Further, these synthesis reactions can be carried out by a batch system or a continuous system. Moreover, for the synthesis reaction described above, a batch type reaction vessel, a single-tank type or multi-tank type continuous reactor, a tubular continuous reactor, and the like may be used singly, or in an appropriate combination thereof.

In the production of the polyamide-based thermoplastic elastomer, the polymerization temperature is preferably from 150° C. to 300° C., and more preferably from 160° C. to 280° C. Further, the polymerization time can be determined as appropriate based on the weight average molecular weight of the polyamide-based thermoplastic elastomer to be synthesized and the polymerization temperature. For example, the polymerization time is preferably from 0.5 hours to 30 hours, and more preferably from 0.5 hours to 20 hours.

In the production of the polyamide-based thermoplastic elastomer, if necessary, an additive, for example, a monoamine or a diamine, such as lauryl amine, stearylamine, hexamethylenediamine, or meta-xylylene diamine, a monocarboxylic acid or a dicarboxylic acid, such as acetic acid, benzoic acid, stearic acid, adipic acid, sebacic acid, or dodecanedioic acid, or the like, may be added, for the purpose of adjusting the molecular weight or stabilizing the melt viscosity at the time of fabrication. These additives can be selected as appropriate, based on the molecular weight or the viscosity of the polyamide-based thermoplastic elastomer to be obtained or the like, within a range that does not exert adverse influence on the effects of the invention.

Further, in the production of the polyamide-based thermoplastic elastomer, a catalyst can be used, if necessary. Examples of the catalyst include compounds containing at least one kind selected from the group consisting of P, Ti, Ge, Zn, Fe, Sn, Mn, Co, Zr, V, Ir, La, Ce, Li, Ca, and Hf.

Examples thereof include an inorganic phosphorous compound, an organic titanium compound, an organic zirconium compound, and an organic tin compound.

Specific examples of the inorganic phosphorus compound include a phosphorous-containing acid such as phosphoric acid, diphosphoric acid, polyphosphoric acid, phosphorous acid, or phosphinic acid; an alkaline metal salt of a phosphorus-containing acid; and an alkaline earth metal salt of a phosphorus-containing acid.

Examples of the organic titanium compound include titanium alkoxides (titanium tetrabutoxide, titanium tetraisopropoxide, and the like).

Examples of the organic zirconium compound include zirconium alkoxides (zirconium tetrabutoxide (also called "Zr(OBu)$_4$" or "Zr(OC$_4$H$_9$)$_4$") and the like).

Examples of the organic tin compound include distannoxane compounds (1-hydroxy-3-(isothiocyanato-1,1,3,3-tetrabutyldistannoxane and the like), tin acetate, dibutyltin dilaurate, and butyltin hydroxide oxide hydrate.

The addition amount of the catalyst and the time to add the catalyst are not particularly limited, as long as the objected substance can be obtained quickly under these conditions.

As the polyamide-based thermoplastic elastomer, for example, a combination of a ring-opening polycondensation product of lauryllactam/polyethylene glycol/adipic acid, a combination of a ring-opening polycondensation product of lauryllactam/polypropylene glycol/adipic acid, a combination of a ring-opening polycondensation product of lauryllactam/polytetramethylene ether glycol/adipic acid, a combination of a ring-opening polycondensation product of lauryllactam/an ABA-type triblock polyether/adipic acid, a combination of a ring-opening polycondensation product of lauryllactam/an ABA-type triblock polyether diamine/adipic acid, a combination of a ring-opening polycondensation product of lauryllactam/polyethylene glycol/decanedicarboxylic acid, a combination of a ring-opening polycondensation product of lauryllactam/polypropylene glycol/decanedicarboxylic acid, a combination of a ring-opening polycondensation product of lauryllactam/polytetramethylene ether glycol/decanedicarboxylic acid, a combination of a ring-opening polycondensation product of lauryllactam/an ABA-type triblock polyether/decanedicarboxylic acid, a combination of a ring-opening polycondensation product of lauryllactam/an ABA-type triblock polyether diamine/decanedicarboxylic acid, a combination of a polycondensation product of aminododecanoic acid/polyethylene glycol/adipic acid, a combination of a polycondensation product of aminododecanoic acid/polypropylene glycol/adipic acid, a combination of a polycondensation product of aminododecanoic acid/polytetramethylene ether glycol/adipic acid, a combination of a polycondensation product of aminododecanoic acid/an ABA-type triblock polyether/adipic acid, a combination of a polycondensation product of aminododecanoic acid/an ABA-type triblock polyether diamine/adipic acid, a combination of a polycondensation product of aminododecanoic acid/polyethylene glycol/decanedicarboxylic acid, a combination of a polycondensation product of aminododecanoic acid/polypropylene glycol/decanedicarboxylic acid, a combination of a polycondensation product of aminododecanoic acid/polytetramethylene ether glycol/decanedicarboxylic acid, a combination of a polycondensation product of aminododecanoic acid/an ABA-type triblock polyether/decanedicarboxylic acid, and a combination of a polycondensation product of aminododecanoic acid/an ABA-type triblock polyether diamine/decanedicarboxylic acid are preferable. A combination of a ring-opening polycondensation product of lauryllactam/an ABA-type triblock polyether/adipic acid, a combination of a polycondensation product of aminododecanoic acid/an ABA-type triblock polyether/adipic acid, a combination of a polycondensation product of aminododecanoic acid/an ABA-type triblock polyether diamine/decanedicarboxylic acid, a combination of a polycondensation product of aminododecanoic acid/polytetramethylene ether glycol/adipic acid, and a combination of a polycondensation product of aminododecanoic acid/polytetramethylene ether glycol/decanedicarboxylic acid are particularly preferable. As the polyamide-based thermoplastic elastomer, the preferable modes described above may be used in combination, considering the combination of the constituent units, the constituent ratio thereof, the molecular weight, and the like.

In the resin material, as desired, various additives such as rubber, various fillers (for example, silica, calcium carbonate, or clay), an aging inhibitor, an oil, a plasticizer, a colorant, a weather-proofing agent, or a reinforcing material may be incorporated. The content of the additives in the resin material (tire frame) is not particularly limited, and the additives can be appropriately used, as long as the effects of the invention are not impaired. In the case of adding components other than the resin, such as additives, to the resin material, the content of the resin component in the resin material is preferably 50% by mass or higher, and more preferably 90% by mass or higher, with respect to the total amount of the resin material. Here, the content of the resin component in the resin material indicates the residue obtained by subtracting the total content of the additives from the total amount of the resin material.

(Physical Properties of Resin Material)

Next, preferable physical properties of the resin material that constitutes the tire frame are explained. The tire frame in the invention is formed by using the resin material described above.

The melting temperature (or softening temperature) of the resin material (tire frame) itself is normally from 100° C. to 350° C., is preferably from approximately 100° C. to approximately 250° C., and from the viewpoint of manufacturability of the tire, is preferably from approximately 120° C. to approximately 250° C., and is more preferably from 120° C. to 200° C.

When, for example, a frame of a tire is formed by welding together divided bodies (frame pieces), by using a resin material with a melting temperature of from 120° C. to 250° C. in this manner achieves sufficient strength of bonding of the tire frame pieces together even for a frame welded in an ambient temperature range of from 120° C. to 250° C. The tire of the invention accordingly has excellent durability during running, such as puncture resistance and abrasion resistance properties. The heating temperature is preferably a temperature that is from 10° C. to 150° C. higher, and is more preferably a temperature from 10° C. to 100° C. higher, than the melting temperature (or softening temperature) of the resin material forming the tire frame pieces.

The resin material may be obtained by adding various additives if necessary, and mixing as appropriate using a known method (for example melt mixing).

A resin material obtained by melt mixing may be employed in a pellet form, if necessary.

The resin material (the tire frame) itself has a tensile yield strength as defined in JIS K7113:1995 of equal to or higher than 5 MPa, more preferably 5 MPa to 20 MPa, and still more preferably 5 MPa to 17 MPa. When the tensile yield strength of the resin material is equal to or higher than 5 MPa, resistance to deformation caused by a load applied to a tire during traveling or the like can be achieved.

The resin material (the tire frame) itself preferably has a tensile yield elongation as defined in JIS K7113:1995 of equal to or higher than 10%, more preferably 10% to 70%, and still more preferably 15% to 60%. When the tensile yield elongation of the resin material is equal to or higher than 10%, the elastic region is large, and the air sealing property is improved.

The resin material (the tire frame) itself preferably has a tensile elongation at break as defined in JIS K7113:1995 of equal to or higher than 50%, more preferably equal to or higher than 100%, still more preferably equal to or higher than 150%, and particularly preferably equal to or higher than 200%. When the tensile elongation at break of the resin material is equal to or higher than 50%, fittability onto a rim is excellent, and resistance to breaking at collision can be obtained.

The resin material (the tire frame) itself preferably has a deflection temperature under load (under a load of 0.45 MPa) as defined in ISO 75-2 or ASTM D648 of equal to or higher than 50° C., more preferably 50° C. to 150° C., and still more preferably 50° C. to 130° C. When the deflection temperature under load of the resin material is equal to or higher than 50° C., deformation of a tire frame can be suppressed even in cases in which vulcanization is performed during the production of a tire.

Embodiment 1

A tire according to Embodiment 1 of the tire of the invention will be described below with reference to the drawings.

Figure 1B:
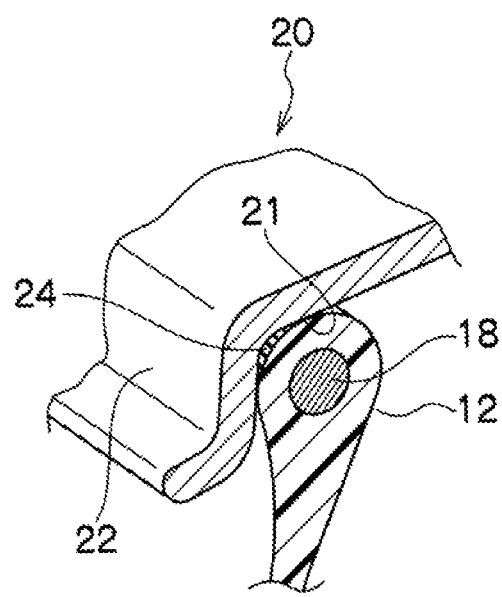
FIG. 1B is a cross-sectional view illustrating a bead portion fitted onto a rim.

A tire 10 according to this embodiment will be described below. FIG. 1A is a perspective view illustrating a cross-section of a part of a tire according to one embodiment of the invention. FIG. 1B is a cross-sectional view of a bead portion fitted to a rim. As shown in FIG. 1A, the tire 10 according to this embodiment has substantially the same cross-sectional shape as those of conventional general rubber pneumatic tires.

As shown in FIG. 1A, the tire 10 includes a tire case 17 composed of: a pair of bead portions 12 each contacting with a bead seat 21 and a rim flange 22 of a rim 20 shown in FIG. 1B; side portions 14 that extend from the bead portions 12 toward the outer side in the tire radial direction; and a crown portion 16 (outer peripheral portion) that connect the outer end in the tire radial direction of one side portion 14 and the outer end in the tire radial direction of the other side portion 14.

Here, in the tire case 17 of the present embodiment, for example, a mixture obtained by adding additives to the polyamide-based thermoplastic elastomer having a weight average molecular weight of from 15,700 to 75,000 can be used as the resin material.

The tire case 17 of the present embodiment is formed with a single resin material; however, the configuration of the invention is not limited thereto, and, similarly to ordinary conventional rubber-made pneumatic tires, thermoplastic resin materials with different characteristics may be employed for each of the sections of the tire case 17 (such as the side portions 14, the crown portion 16 and the bead portions 12). The tire case 17 may be reinforced by a reinforcing material by embedding the reinforcing material (such as fibers, cord, nonwoven fabric, or woven fabric of a polymer material or metal) in the tire case 17 (for example, in the bead portions 12, the side portions 14, the crown portion 16, and the like).

The tire case 17 according to the present embodiment is formed by bonding a pair of tire case half parts (tire frame pieces) 17A formed of a resin material to each other. The tire case half parts 17A is formed by placing circular tire case half parts 17A that have the same shape and that are obtained by molding one bead portion 12, one side portion 14, and a half-width of the crown portion 16 as an integral body by injection molding or the like, to face each other, and bonding the half parts to each other at the tire equatorial plane portion. The tire case 17 is not limited to that obtained by bonding two members, and may be formed by bonding three or more members.

Each tire case half part 17A formed of the resin material can be molded by, for example, vacuum molding, pressure molding, injection molding, or melt casting. Accordingly, when compared with a conventional case in which the tire case is molded from rubber, it is not necessary to perform vulcanization, as a result of which the production process can remarkably be simplified, and the molding time can be saved.

In the present embodiment, the tire case half parts 17A have a symmetric shape, that is, one tire case half part 17A and the other tire case half part 17A have the same shape; therefore, there is an advantage in that the tire case half parts 17A can be molded using only one type of mold.

In the present embodiment, as shown in FIG. 1B, an annular bead core 18 formed of a steel cord is embedded in each bead portion 12, similarly to conventional general pneumatic tire. However, the invention is not limited to this configuration; the bead core 18 may be omitted as long as the rigidity of the bead portions 12 is ensured and there is no problem in fitting to the rim 20. Other than the steel cord, the bead core may be formed of an organic fiber cord, a resin-coated organic fiber cord, a hard resin, or the like.

In the present embodiment, an annular sealing layer 24 formed of a material having higher sealing properties than those of the resin material constituting the tire case 17, for example rubber, is provided on a part of the bead portion 12 that contacts the rim 20 or at least on a part of the bead portion 12 that contacts the rim flange 22 of the rim 20. The sealing layer 24 may also be provided in a part in which the tire case 17 (the bead portion 12) and the bead seat 21 contact each other. A material softer than the resin material that constitutes the tire case 17 may be used as the material having higher sealing properties than those of the resin material that constitutes the tire case 17. It is preferable to use, as a rubber usable for the sealing layer 24, the same kind of rubber as a rubber used on the outer surface of a bead portion of a conventional general rubber pneumatic tire. Other thermoplastic resins (thermoplastic elastomers) having higher sealing properties than those of the resin material may be used. Examples of other thermoplastic resins include resins such as a polyurethane-based resin, a polyolefin-based resin, a polystyrene-based thermoplastic resin, and a polyester resin, and a blend of any of these resins with a rubber or an elastomer. Thermoplastic elastomers can also be used, and examples thereof include a polyester-based thermoplastic elastomer, a polyurethane-based thermoplastic elastomer, a polystyrene-based thermoplastic elastomer, and a polyolefin-based thermoplastic elastomer, and any combination of these elastomers and a blend of any of these elastomers with a rubber.

As shown in FIG. 1A, in the crown portion 16, a reinforcing cord 26 having higher rigidity than that of the resin material constituting the tire case 17 is wound in the circumferential direction of the tire case 17. The reinforcing cord 26 is helically wound to form a reinforcing cord layer 28 in a state in which at least a part of the reinforcing cord 26 is embedded in the crown portion 16 in a cross-sectional view taken along the axial direction of the tire case 17. A crown 30 formed of a material, such as rubber, having higher abrasion resistance than that of the resin material constituting the tire case 17 is disposed on the outer circumference side in the tire radial direction of the reinforcing cord layer 28.

Figure 2:
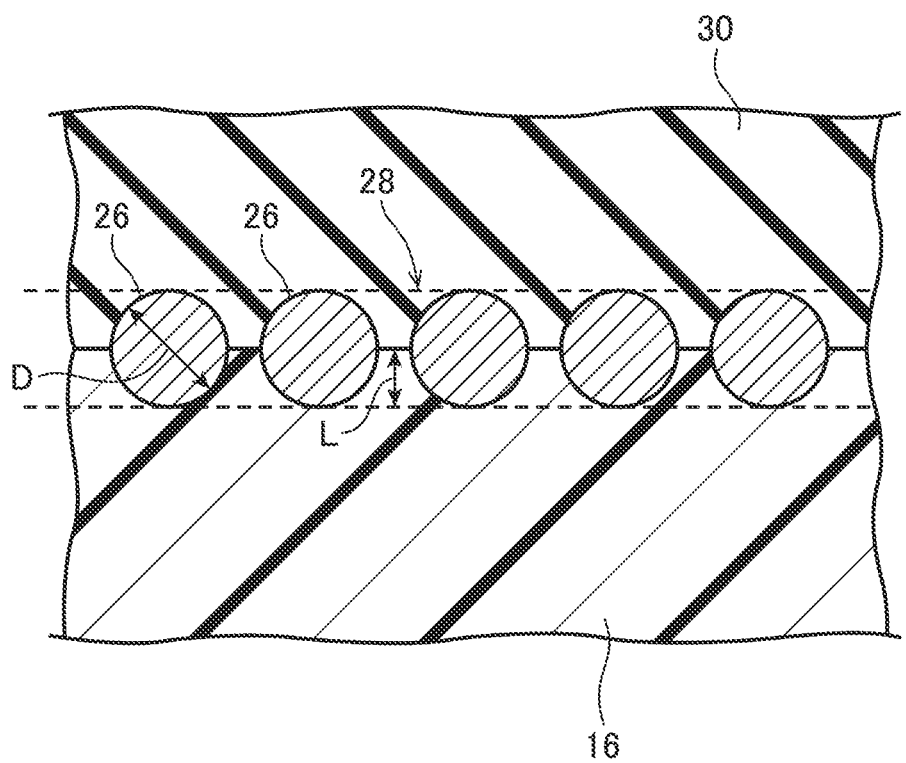
FIG. 2 is a cross-sectional view taken along a tire rotation axis, which illustrates a state where a reinforcing cord is embedded in a crown portion of a tire case of the tire according to the first embodiment of the present invention.

The reinforcing cord layer 28 formed by the reinforcing cord 26 will be described below with reference to FIG. 2. FIG. 2 is a cross-sectional view taken along the tire rotation axis, which illustrates a state in which the reinforcing cord is embedded in the crown portion of the tire case of the tire according to Embodiment 1. As shown in FIG. 2, the reinforcing cord 26 is helically wound in a state in which at least a part of the reinforcing cord 26 is embedded in the crown portion 16 in a cross-sectional view taken along the axial direction of the tire case 17, and, together with a part of the outer circumferential portion of the tire case 17, forms the reinforcing cord layer 28 specified by the dotted lines in FIG. 2. The part of the reinforcing cord 26 that is embedded in the crown portion 16 is in close contact with the resin material constituting the crown portion 16 (the tire case 17). A monofilament (single filament) of a metal fiber, an organic fiber, or the like, or a multifilament (stranded filament) in which fibers are stranded, such as a steel cord composed of steel fibers, may be used as the reinforcing cord 26. In the present embodiment, a steel cord is used as the reinforcing cord 26.

The embedding depth L in FIG. 2 represents the depth of embedding of the reinforcing cord 26 in the tire case 17 (the crown portion 16) in the tire rotation axis direction. The depth of embedding L of the reinforcing cord 26 in the crown portion 16 is preferably equal to or greater than ⅕ of the diameter D of the reinforcing cord 26, and more preferably more than ½ of the diameter D of the reinforcing cord 26. It is most preferable that the entire reinforcing cord 26 be embedded in the crown portion 16. When the depth of embedding L of the reinforcing cord 26 is more than ½ of the diameter D of the reinforcing cord 26, the reinforcing cord 26 is difficult to drop off from the embedded portion due to the dimensions of the reinforcing cord 26. When the reinforcing cord 26 is entirely embedded in the crown portion 16, the surface (the outer circumferential surface) becomes flat, whereby entry of air into an area around the reinforcing cord can be suppressed even when a member is placed on the crown portion 16 in which the reinforcing cord 26 is embedded. The reinforcing cord layer 28 corresponds to a belt disposed on the outer circumferential surface of a carcass of a conventional rubber pneumatic tire.

As described above, the crown 30 is disposed on the outer circumferential side in the tire radial direction of the reinforcing cord layer 28. It is preferable that the same kind of rubber as that used for conventional rubber pneumatic tires is used as the rubber used for the crown 30. It is also possible to use, instead of the crown 30, a crown formed of another kind of resin material which has higher abrasion resistance than that of the resin material constituting the tire case 17. In the crown 30, a crown pattern composed of plural grooves is formed on the contact surface that comes into contact with a road surface, similarly to conventional rubber pneumatic tires.

A method of producing a tire of the invention will be described below.

(Tire Case Forming Step)

First, tire case half parts are formed by using the resin material containing the polyamide-based thermoplastic elastomer. It is preferable to form the tire case by injection molding. Next tire case half parts supported by thin metal support rings are arranged to face each other. Subsequently, a mold for bonding, which is not shown in the drawings, is placed so as to contact the outer circumferential surface of a portion at which the tire case half parts are contacted with each other. Here, the mold for bonding is configured to pressurize a region at or around the bonding section (the contact portion) of the tire case half parts 17A with a predetermined pressure. Then, the region at or around the bonding section of the tire case half parts is pressurized at a temperature equal to or higher than the melting temperature (or the softening temperature) of the resin material that constitutes the tire case. When the bonding section of the tire case half parts is heated and pressurized by the mold for bonding, the bonding section is melted, and the tire case half parts are fused with each other, as a result of which the members are integrated to form the tire case 17. Although the bonding section of the tire case half parts is heated using the mold for bonding in the present embodiment, the invention is not limited to this configuration; heating of the bonding section may be carried out using, for example, a separately-provided high-frequency heater, or the tire case half parts may be bonded by softening or melting the bonding section, in advance, via application of hot air, irradiation of infrared rays or the like, and pressurizing the bonding section using the mold for bonding.

(Reinforcing Cord Member Winding Step)

Figure 3:
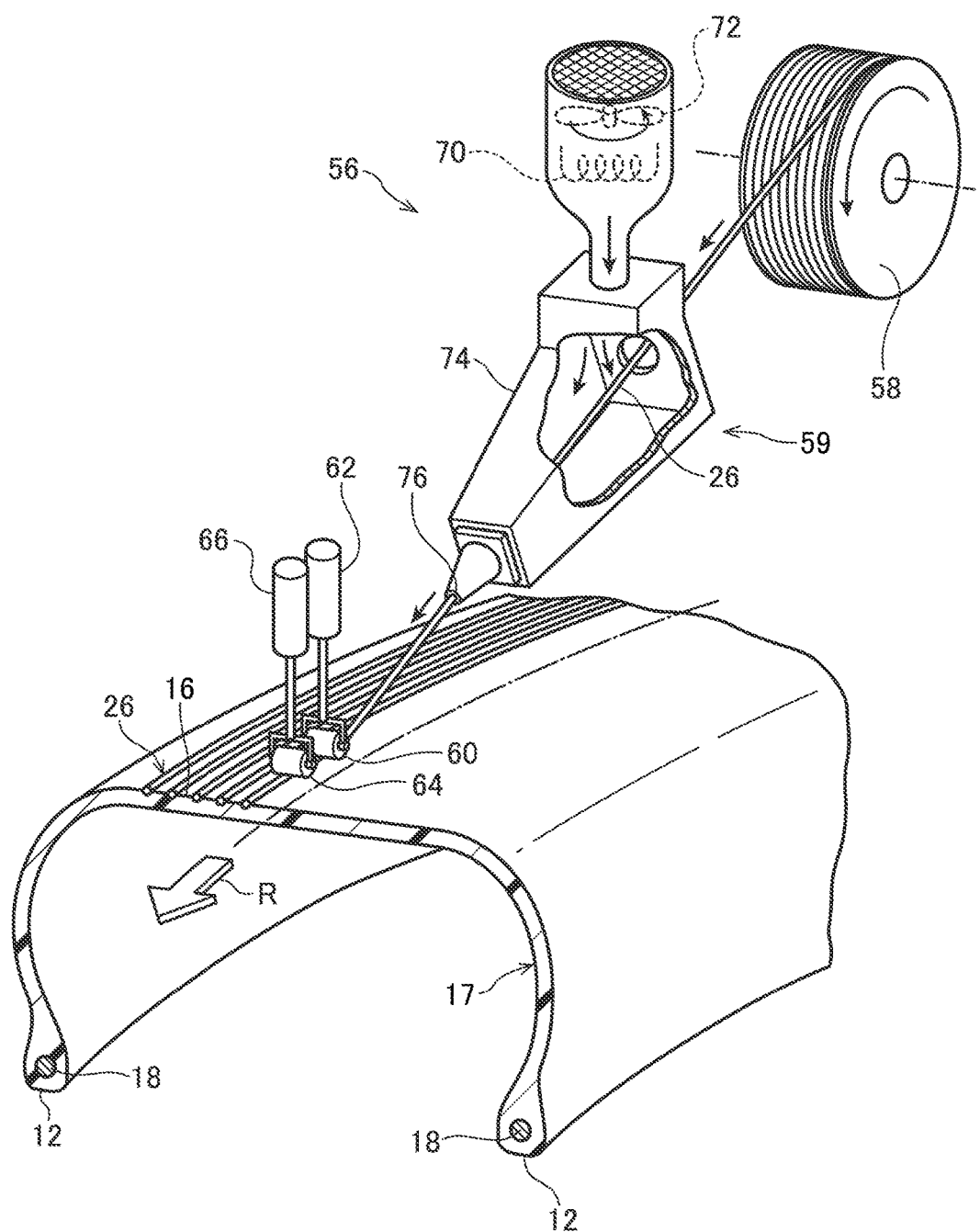
FIG. 3 is a diagram illustrating an operation of embedding the reinforcing cord in the crown portion of the tire case by the use of a cord heating apparatus and rollers.

Next, a reinforcing cord winding step will be described below using FIG. 3. FIG. 3 is an explanatory diagram explaining an operation of embedding the reinforcing cord in the crown portion of the tire case using a cord heating device and rollers. In FIG. 3, a cord feeding apparatus 56 includes a reel 58 on which a reinforcing cord 26 is wound, a cord heating device 59 disposed at the downstream side in the cord feeding direction of the reel 58, a first roller 60 disposed at the downstream side in the reinforcing cord 26 feeding direction, a first cylinder unit 62 for moving the first roller 60 in directions in which the first roller comes into contact with and get away from the outer circumferential surface of the tire, a second roller 64 disposed at the downstream side in the reinforcing cord 26 feeding direction of the first roller 60, and a second cylinder unit 66 for moving the second roller 64 in directions in which the first roller comes into contact with and get away from the outer circumferential surface of the tire. The second roller 64 can be used as a cooling roller formed of metal. In the present embodiment, the surface of the first roller 60 or the second roller 64 is coated with a fluororesin (TEFLON (registered trademark) in the case of the present embodiment) with a view to suppressing adhesion of the melted or softened resin material. Although the cord feeding apparatus 56 is configured to have two rollers of the first roller 60 and the second roller 64 in the present embodiment, the invention is not limited to this configuration, and the cord feeding apparatus may be configured to have only one of these rollers (that is, a single roller).

The cord heating device 59 includes a heater 70 and a fan 72 that generate hot air. The cord heating device 59 includes a heating box 74 into which hot air is supplied and in which the reinforcing cord 26 passes through the inside space thereof, and an discharge port 76 through which the heated reinforcing cord 26 is discharged.

In this step, first, the temperature of the heater 70 of the cord heating device 59 is increased, and the air around the heater 70 heated by the heater 70 is sent to the heating box 74 by an air current generated by the rotation of the fan 72. Then, the reinforcing cord 26 drawn out from the reel 58 is fed to the inside of the heating box 74 of which the inner space is heated with hot air, whereby the reinforcing cord 25 is heated (for example, to increase the temperature of the reinforcing cord 26 to be about 100° C. to about 200° C.). The heated reinforcing cord 26 passes through the discharge port 76, and is helically wound, with a constant tension, around the outer circumferential surface of the crown portion 16 of the tire case 17 rotating in the direction of arrow R in FIG. 3. Here, as a result of the heated reinforcing cord 26 coming into contact with the outer circumferential surface of the crown portion 16, the resin material at the contact portion is melted or softened, and at least a part of the heated reinforcing cord 26 is embedded in the outer circumferential surface of the crown portion 16. In this process, since the heated reinforcing cord 26 is embedded in the melted or softened resin material, the resin material and the reinforcing cord 26 get into a state in which no space is left between the resin material and the reinforcing cord 26, that is, in a tightly-contacted state. Accordingly, the incorporation of air into the portion in which the reinforcing cord 26 is embedded is suppressed. By heating the reinforcing cord 26 to a temperature higher than the melting temperature (or the softening temperature) of the resin material of the tire case 17, the melting or softening of the resin material in the portion contacting the reinforcing cord 26 is promoted. By employing this configuration, embedding of the reinforcing cord 26 in the outer circumferential surface of the crown portion 16 is facilitated, and the incorporation of air can effectively be suppressed.

The depth L of embedding of the reinforcing cord 26 can be adjusted by the heating temperature for the reinforcing cord 26, the tension applied to the reinforcing cord 26, the pressure applied from the first roller 60, etc. In the present embodiment, the depth L of embedding of the reinforcing cord 26 is set to be equal to or greater than 1/5 of the diameter D of the reinforcing cord 26. The depth L of embedding of the reinforcing cord 26 is more preferably more than 1/2 of the diameter D, and it is still more preferable that the entire reinforcing cord 26 is embedded.

In this way, a reinforcing cord layer 28 is formed on the outer circumference side of the crown portion 16 of the tire case 17 by winding the heated reinforcing cord 26 on the outer circumferential surface of the crown portion 16 such that the heated reinforcing cord 26 is embedded in the outer circumferential surface of the crown portion 16.

A belt-shaped vulcanized crown 30 is wound on the outer circumferential surface of the tire case 17 for one revolution, and the crown 30 is bonded to the outer circumferential surface of the tire case 17 using, for example, an adhesive. For example, precured crown known thus far for use in retreaded tires may be used as the crown 30. This step is a step similar to a step of bonding a precured crown to the outer circumferential surface of a casing of a retreaded tire.

A tire 10 can be completed by bonding a sealing layer 24 formed of a vulcanized rubber to the bead portion 12 of the tire case 17 using, for example, an adhesive.

(Effects)

In the tire 10 of the present embodiment, since the tire case 17 is formed of a resin material including the polyamide-based thermoplastic elastomer having a weight average molecular weight of from 17,500 to 75,000, the pressure resistance and the fittability onto a rim can be enhanced. Further, the tire 10 has a simpler structure as compared with conventional tires made of rubber, and is hence lighter in weight. Accordingly, the tire 10 of the present embodiment has high friction resistance and high durability. Moreover, since the tire case 17 can be produced by injection molding, the productivity is also extremely excellent.

In addition, in the tire 10 of the embodiment, since the reinforcing cord 26 having a higher stiffness than the resin material is wound in a spiral shape in the circumferential direction on the outer circumferential surface of the crown portion 16 in the tire case 17 formed of the resin material, the puncture resistance, the cutting resistance and the stiffness of the tire 10 in the circumferential direction are improved. Meanwhile, the improvement of the stiffness of the tire 10 in the circumferential direction prevents the creeping in the tire case 17 formed of the resin material.

In a cross-sectional view taken along the axial direction of the tire case 17 (the cross-section shown in FIG. 1), at least a part of the reinforcing cord 26 is embedded in the outer circumferential surface of the crown portion 16 of the tire case 17 formed of the resin material, and is in close contact with the resin material, as a result of which incorporation of air during production is suppressed, and movement of the reinforcing cord 26 due to, for example, a force applied at the time of traveling is suppressed. Accordingly, separation between the reinforcing cord 26, the tire case 17, and the crown 30 is suppressed, and the durability of the tire 10 is improved.

In a case in which the reinforcing cord layer 28 is configured to include the resin material as described above, the reinforcing cord 26 can be made to more tightly contact the tire case 17 and fixed to the tire case 17 since the difference in hardness between the tire case 17 and the reinforcing cord layer 28 can be made smaller than that in a case in which the reinforcing cord 26 is fixed using a cushion rubber. Accordingly, the incorporation of air mentioned above can effectively be prevented, and the movement of the reinforcing cord member at the time of traveling can effectively be suppressed.

In a case in which the reinforcing cord 26 is a steel cord, the reinforcing cord 26 can easily be separated from the resin material by heating and recovered at the time of disposing of the tire, and, therefore, there is an advantage from the viewpoint of recyclability of the tire 10. Further, since the resin material has a lower loss factor (tan δ) compared with vulcanized rubbers, inclusion of a large amount of the resin material in the reinforcing cord layer 28 makes it possible to enhance the rolling properties of the tire. Compared with vulcanized rubbers, the resin material has advantages in terms of high in-plane shear stiffness, excellent steering stability at the time of traveling with the tire, and excellent abrasion resistance.

In addition, since the depth L of embedding of the reinforcing cord 26 is equal to or greater than 1/5 of the diameter D as illustrated in FIG. 2, incorporation of air during manufacturing is effectively suppressed, and the movement of the reinforcing cord 26 due to input power or the like while travelling is further suppressed.

Since the crown 30 that contacts a road surface is formed of a rubber material having higher abrasion resistance than that of the resin material constituting the tire case 17, the abrasion resistance of the tire 10 is improved.

Since the annular bead core 18 formed of a metal material is embedded in the bead portion 12, the tire case 17 is strongly fixed to the rim 20, i.e., the tire 10 is strongly fixed to the rim 20, similarly to conventional rubber pneumatic tires.

By providing a sealing layer 24, which is formed of a rubber material having higher sealing properties than those of the resin material constituting the tire case 17, on a part of the bead portion 12 that contacts the rim 20, the rim fittability between the tire 10 and the rim 20 can be further enhanced.

Although a configuration in which the reinforcing cord 26 is heated such that the polyamide-based thermoplastic elastomer in a portion that contacts the heated reinforcing cord 26 is melted or softened is adopted in the embodiment described above, the invention is not limited to this configuration; a hot air generating device may be used, instead of heating the reinforcing cord 26, to heat the outer circumferential surface of the crown portion 16 in which the reinforcing cord 26 is to be embedded, and the reinforcing cord 26 may thereafter be embedded in the crown portion 16.

Although the heat source of the cord heating device 59 includes the heater and the fan in Embodiment 1, the invention is not limited to this configuration, and a configuration in which the reinforcing cord 26 is directly heated by radiation heat (for example, infrared rays) may be adopted.

Although a configuration in which a region at which the resin material with the reinforcing cord 26 embedded therein is melted or softened is forcibly cooled with the second roller 64 formed of metal is adopted in Embodiment 1, the invention is not limited to this configuration; a configuration in which cold air is directly applied to the region at which the resin material is melted or softened, to forcibly cool and solidify the region at which the resin material is melted or softened may also be adopted.

Although a configuration in which the reinforcing cord 26 is heated is adopted in Embodiment 1, a configuration in which the outer circumference of the reinforcing cord 26 is coated with the same resin material as that of the tire case 17, for example, may be adopted. In this case, by heating the coated resin material along with the reinforcing cord 26 when the coated reinforcing cord is wound on the crown portion 16 of the tire case 17, incorporation of air can effectively be suppressed at the time of embedding the reinforcing cord in the crown portion 16.

Helically winding the reinforcing cord 26 is easy from the viewpoint of production. However, a method in which the reinforcing cord 26 is discontinuous in the width direction, for example, may also be contemplated.

The tire 10 of Embodiment 1 is a so-called tubeless tire, in which an air chamber is formed between the tire 10 and the rim 20 when the bead portion 12 is fitted onto the rim 20. However, the invention is not limited to this configuration, and the tire may have a complete tube form. Further, the tire of the invention may have a mode in which a reinforcing cord member is used, the cord member being covered with a resin material, as shown in the second embodiment (FIG. 4 and FIG. 5) of JP-A No. 2012-46030.

Although modes for carrying out the invention are described above with reference to embodiments, the embodiments are merely examples, and may be practiced with various modifications within a range that does not depart from the gist of the invention. Of course, the protection scope of the invention is not limited to these embodiments.

EXAMPLES

More specific explanation regarding the invention is given below based on Examples. However the invention is not limited thereto.

First, tires of Examples and Comparative Examples were formed according to the first embodiment. When doing so, the materials listed in the following Table 1 were employed as the material for forming the tire cases. Physical evaluation of the materials and evaluation of the tire performance was performed as set out below for each of the Examples and Comparative Examples.

Comparative Example 1

11.24 kg of 12-aminodecanoic acid, 5.64 kg of an ABA-type triblock polyether diamine (trade name: XTJ-542, manufactured by HUNTSMAN Corporation), and 1.12 kg of adipic acid were placed in a 50 L pressure vessel equipped with a stirrer, a thermometer, a torque meter, a pressure gauge, a nitrogen gas inlet, a pressure adjusting device, and a polymer outlet.

Subsequently, the gas inside the vessel was thoroughly substituted by nitrogen, and then, while supplying nitrogen gas, the pressure inside the vessel was adjusted to 0.05 MPa, and the temperature was raised from room temperature to 240° C. Further, while adjusting the pressure inside the vessel to 0.05 MPa, polymerization (polymerization reaction A) was carried out at 240° C. for 2 hours.

Subsequently, the flow rate of nitrogen gas was decreased, and further, the inside of the vessel was vacuumed by using a vacuum pump, and polymerization (polymerization reaction B) was carried out at 240° C. for 1 hour, to obtain a polyamide-based thermoplastic elastomer.

Example 1

A polyamide-based thermoplastic elastomer was obtained in a manner substantially similar to that in Comparative Example 1, except that, in Comparative Example 1, the polymerization reaction B was carried out under the condition of 240° C. for 2 hours.

Example 2

A polyamide-based thermoplastic elastomer was obtained in a manner substantially similar to that in Comparative Example 1, except that, in Comparative Example 1, the polymerization reaction B was carried out under the condition of 240° C. for 3 hours.

Example 3

A polyamide-based thermoplastic elastomer was obtained in a manner substantially similar to that in Comparative Example 1, except that, in Comparative Example 1, the polymerization reaction B was carried out under the condition of 240° C. for 4.2 hours.

Example 6

A polyamide-based thermoplastic elastomer was obtained in a manner substantially similar to that in Comparative Example 1, except that, in Comparative Example 1, the polymerization reaction B was carried out under the condition of 240° C. for 4.7 hours.

Comparative Example 2

A polyamide-based thermoplastic elastomer was obtained in a manner substantially similar to that in Comparative Example 1, except that, in Comparative Example 1, the polymerization reaction B was carried out under the condition of 240° C. for 5 hours.

Comparative Example 3

13.6 kg of laurilolactam (manufactured by Sigma-Aldrich Corporation), 0.99 kg of 12-aminododecanoic acid (manufactured by Sigma-Aldrich Corporation), and 3.43 kg of decanedicarboxylic acid (manufactured by Sigma-Aldrich Corporation) were placed in a 50 L pressure vessel equipped with a stirrer, a thermometer, a torque meter, a pressure gauge, a nitrogen gas inlet, a pressure adjusting device, and a polymer outlet.

Subsequently, the temperature inside the vessel was raised to 280° C., and the mixture was stirred for 2 hours. Further, nitrogen gas was supplied, and polymerization was carried out at 280° C. for 2 hours, to obtain nylon 12 (the polyamide 12 described above) having carboxylic acids at the both terminals ("nylon" is a registered trademark).

Subsequently, 12.43 kg of the nylon 12 thus obtained and 5.57 kg of PTMG (polytetramethylene ether glycol, manufactured by Wako Pure Chemical Industries, Ltd.; weight average molecular weight of 650) were placed in the vessel, nitrogen was supplied, the temperature was raised to 200° C., and stirring was started. Then, 3.937 g of a catalyst ($Zr(O-C_4H_9)_4$) (manufactured by Sigma-Aldrich Corporation) were added thereto. Thereafter, the temperature inside the vessel was raised to 260° C., and further, the inside of the vessel was vacuumed by using a vacuum pump. The mixture was further stirred for 2 hours and polymerization reaction (polymerization reaction C) was carried out, to obtain a polyamide-based thermoplastic elastomer.

Example 4

A polyamide-based thermoplastic elastomer was obtained in a manner substantially similar to that in Comparative Example 3, except that, in Comparative Example 3, the polymerization reaction C was carried out under the condition of 260° C. for 3 hours.

Example 5

A polyamide-based thermoplastic elastomer was obtained in a manner substantially similar to that in Comparative Example 3, except that, in Comparative Example 3, the polymerization reaction C was carried out under the condition of 260° C. for 5 hours.

[Measurement of Weight Average Molecular Weight]

The weight average molecular weights of the polyamide-based thermoplastic elastomers thus obtained were measured using a gel permeation chromatography (trade name: HLC-8320GPC ECO SEC, manufactured by Tosoh Corporation) under the following conditions. Namely, flow late: 0.3 mL/min, temperature: 40° C., eluent: 5 mM TFA.Na in HFIP, molecular weight marker: standard PMMA manufactured by AMERICAN POLYMER STANDARDS CORPORATION, concentration: $0.4 \times 10^{-3}$ g/mL, and injection quantity: 20 µL.

[Pressure Resistance]

Using the respective polymers obtained in Examples and Comparative Examples, tires were formed, with reference to Embodiment 1 described above. Subsequently, the tire was fitted onto a rim, and the inside of the tire was filled with air while applying pressure. The pressure when the tire exploded was measured. In this process, the pressure is represented in scientific notation, taking the pressure at the time of tire explosion in Example 1 as 100. The greater the numeric value, the more excellent the pressure resistance. Note that, in Comparative Example 1 and Comparative Example 3, the tire could not be assembled onto a rim.

[Fittability onto Rim]

Using the respective polymers obtained in Examples and Comparative Examples, tires were formed, with reference to Embodiment 1 described above. Subsequently, the tire was fitted onto a rim. Whether or not the tire can be assembled onto a rim, and with regard to the tire that can be assembled onto a rim, whether or not leakage of air is recognized were measured. The tire which can be assembled onto a rim and in which leakage of air is not recognized is evaluated as "A", and the tire that cannot be assembled onto a rim or the tire in which leakage of air is recognized is evaluated as "C".

[Moldability]

Using the polymers obtained in Examples and Comparative Examples, injection molding was carried out, using a 50 t injection molding apparatus, and using a mold having a size of 40 mm×127 mm, and 2.0 mm in thickness, under the conditions of a molding temperature of 180° C. and a temperature of the mold of 50° C. Then, the shapes of the specimens were checked. Here, the injection speed was 20 mm/s. Further, the specimen in which a burr having a length of 0.5 mm or more is generated is evaluated as "burr is generated".

TABLE 1

|  | C. Ex-1 | Ex-1 | Ex-2 | Ex-3 | C. Ex-2 | C. Ex-3 | Ex-4 | Ex-5 | Ex-6 |
|---|---|---|---|---|---|---|---|---|---|
| Molecular Weight (Mw) | 9870 | 15700 | 34500 | 68500 | 80000 | 7800 | 21200 | 58100 | 75000 |
| Hard Segment Polymer | N12 | N12 | N12 | N12 | N12 | N12 | N12 | N12 | N12 |
| Soft Segment Polymer | TBPEDA | TBPEDA | TBPEDA | TBPEDA | TBPEDA | PTMG | PTMG | PTMG | TBPEDA |
| Hard/Soft segment (mass ratio) | 69/31 | 69/31 | 69/31 | 69/31 | 69/31 | 69/31 | 69/31 | 69/31 | 69/31 |
| Linking Portion | Adipic acid | Adipic acid | Adipic acid | Adipic acid | Adipic acid | DDCA | DDCA | DDCA | Adipic acid |
| Pressure Resistance | — | 100 | 105 | 123 | 131 | — | 100 | 123 | 125 |
| Fittability onto Rim | C | A | A | A | A | C | A | A | A |
| Moldability | Burr is generated | NP | NP | NP | Filling Shortage | Burr is generated | NP | NP | NP |

In Table 1, the abbreviation "Ex." denotes "Example Number", the abbreviation "C. Ex." denotes "Comparative Example Number", the abbreviation "–" denotes "None", the abbreviation "TBPEDA" denotes "ABA-type triblock polyether diamine", and the abbreviation "DDCA" denotes "Decanedicarboxylic acid", and the abbreviation "NP" denotes "no problematic".

In Table 1, the "ABA-type triblock polyether diamine" means $H_2N$-PPG-PTMG-PPG-$N_2H$. Further, PPG means a substance derived from polypropylene glycol, and PTMG means a substance derived from polytetramethylene ether glycol.

As is evident from Table 1, it is understood that, in Comparative Examples in which the weight average molecular weight of the polyamide-based thermoplastic elastomer contained in the tire case is less than 15,700, the fittability onto a rim was inferior, as compared with those in Examples. Further, regarding the moldability, the specimens of Examples were not particularly problematic; however, a burr was generated in the specimens of Comparative Example 1 and Comparative Example 3. Moreover, the melt viscosity of the specimen of Comparative Example 2 was high, and thus shortage of filling with respect to the mold was caused.

Note that, the disclosure of Japanese Patent Application No. 2013-074296 is incorporated by reference into this specification.

What is claimed is:

1. A tire, comprising a circular tire frame formed of a resin material, the resin material comprising a polyamide-based thermoplastic elastomer having a weight average molecular weight of from 45,000 to 75,000, wherein the polyamide-based thermoplastic elastomer comprises, as a hard segment, a polyamide synthesized using a monomer represented by the following Formula (1) or Formula (2):

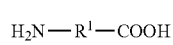

Formula (1)

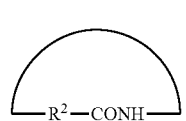

Formula (2)

wherein, in Formula (1), $R^1$ represents a hydrocarbon molecular chain having a carbon number of from 2 to 20 or an alkylene group having a carbon number of from 2 to 20, and, in Formula (2), $R^2$ represents a hydrocarbon molecular chain having a carbon number of from 3 to 20 or an alkylene group having a carbon number of from 3 to 20, and wherein the polyamide comprises a structural unit represented by —CO—$(CH_2)_{11}$—NH—.

* * * * *